United States Patent [19]

Spurgeon

[11] 4,384,531
[45] May 24, 1983

[54] PALLET, SPACER-SUPPORT THEREFOR AND METHOD OF ASSEMBLY

[76] Inventor: Thomas E. Spurgeon, 25 Oakhurst, Apartment 3, Monroe Falls, Ohio 44262

[21] Appl. No.: 254,903

[22] Filed: Apr. 16, 1981

[51] Int. Cl.³ ............................................ B65D 19/26
[52] U.S. Cl. .................................. 108/51.1; 108/57.1
[58] Field of Search .................. 108/56.1, 56.3, 57.1, 108/51.1, 52.1, 51.3

[56] References Cited

U.S. PATENT DOCUMENTS

| Re. 27,725 | 8/1973 | Brumlik | 411/456 X |
|---|---|---|---|
| 2,503,022 | 4/1950 | Benoist et al. | 248/120 |
| 2,597,411 | 5/1952 | Vankrimpen | 108/57.1 |
| 2,633,982 | 4/1953 | Addison | 206/46 |
| 2,841,350 | 7/1958 | Chronister | 248/120 |
| 2,941,770 | 6/1960 | Bonslett | 108/57.1 |
| 2,955,791 | 10/1960 | George | 248/120 |
| 2,957,668 | 10/1960 | Norquist et al. | 248/120 |
| 2,967,036 | 1/1961 | Phillips | 108/57.1 |
| 3,039,726 | 6/1962 | Woodward | 108/57.1 |
| 3,380,403 | 4/1968 | Sullivan | 108/51 |
| 3,393,647 | 7/1968 | Howell | 108/52 |
| 3,425,367 | 4/1969 | Oravez | 108/51 |
| 3,435,784 | 4/1969 | Petersen | 108/51 |
| 3,556,886 | 1/1971 | Reusser | 156/265 |
| 3,641,948 | 2/1972 | Brown | 108/51 |
| 3,645,163 | 2/1972 | Byland | 411/456 X |
| 3,835,791 | 9/1974 | Brown | 108/51 |
| 3,881,429 | 5/1975 | Seymore | 108/51 |
| 3,969,975 | 7/1976 | Krol | 411/456 |

OTHER PUBLICATIONS

American Plywood Association, "Plywood Design Manual-Pallets," Copyright 1975.

Primary Examiner—William E. Lyddane
Attorney, Agent, or Firm—Reese Taylor

[57] ABSTRACT

A load bearing pallet and a spacer-support therefor includes top and bottom decks and an elongate, unitary tubular support body with tapered, sharpened tines projecting from the opposed ends of the body. The tines are designed to be compressively embedded in the top and bottom decks of the pallet to secure the same together. The elongate spacer-support is constructed by die stamping it of flat metal and then rolling it with an open butt seam. A modified form of the invention contemplates the utilization of crossing straps interconnecting the individual slats of the bottom deck and a further modification contemplates a binder or reinforcing strip interconnecting the usual slat members of the top deck. A still further modification includes the provision of projecting barbs or prongs on the tines for improved holding properties. The method of assembly includes embedding not only the tines, but portions of the ends of the tubular members as well into deck members.

7 Claims, 8 Drawing Figures

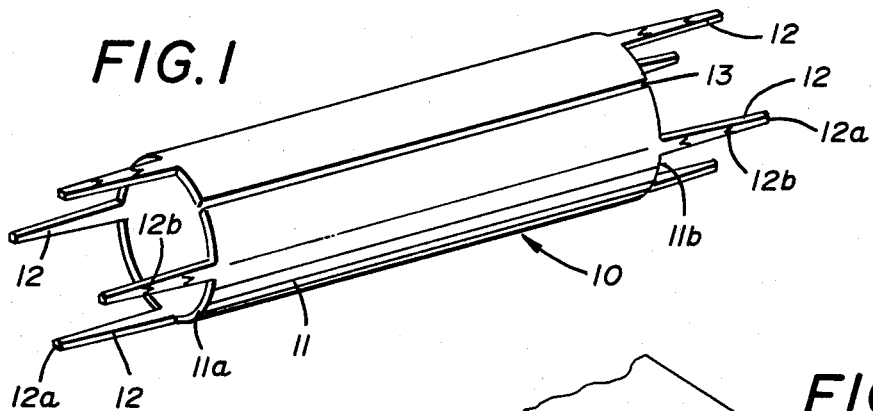
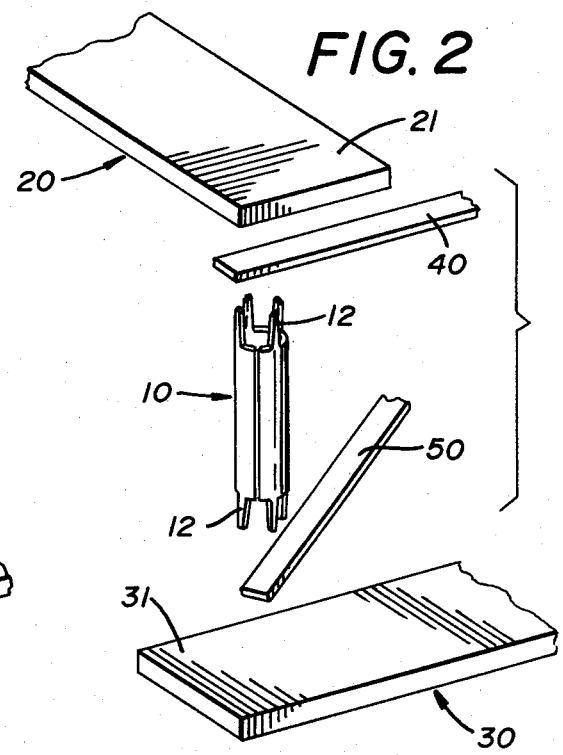
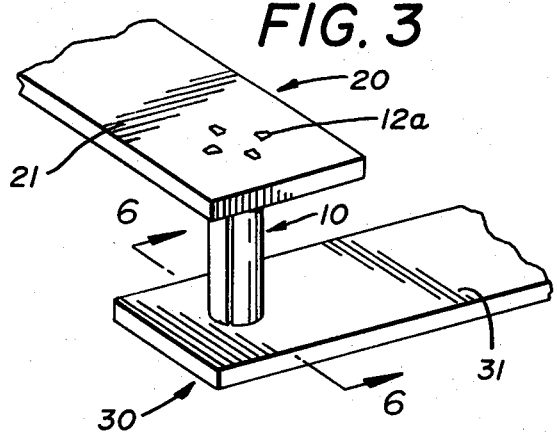
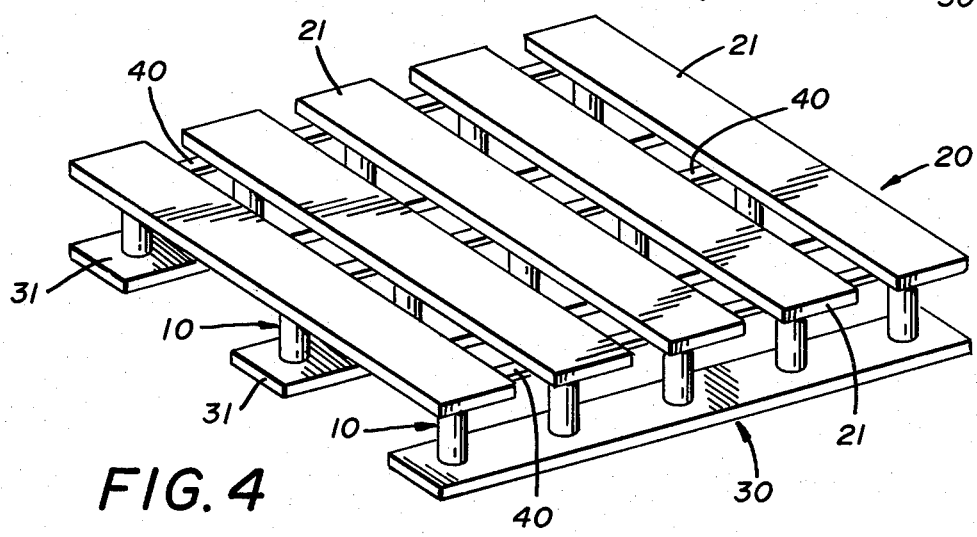

PALLET, SPACER-SUPPORT THEREFOR AND METHOD OF ASSEMBLY

FIELD OF THE INVENTION

This invention relates, in general, to load bearing pallets and in particular to a uniquely constructed "throw away" load bearing pallet and a similarly uniquely constructed spacer-support for interconnecting the top and bottom decks of the pallet.

DESCRIPTION OF THE PRIOR ART

For years load bearing pallets have comprised top and bottom decks, and interconnecting members which are variously described in the art as being spacers, supports, pillars, or spacer-supports. These pallets have been assembled by nailing, cleating, screwing, bolting, stapling or dowling.

More specific forms of assembly can be seen in certain prior art patents.

For example, Chronister U.S. Pat. No. 2,841,350 discloses a corrugated cardboard pallet having a deck with punched slits therein and further having spacer legs with staples which project through the slits and are formed around flat metal strips to secure the legs to the deck.

Another form of assembly can be seen in Howell U.S. Pat. No. 3,393,647 wherein flared tubular dowels are employed to secure the top and bottom decks together by inserting the flared heads of the column supports into pre-formed openings in the deck members.

Still further assembly techniques and structure involve adhesive support-pillar lamination wherein doweling is press-fit or swaged into the decks. This type of construction can be seen in a publication entitled "Plywood Design Manual—Pallets," Copyright 1975, by the American Plywood Association.

More relevant to the present invention is Brown U.S. Pat. No. 3,835,791 which discloses the utilization of either a wire-like spacer-support, including a plurality of spaced vertical wire-like elements held together by a plurality of spaced horizontal elements, with the vertical elements having sharp points for engagement with the top and bottom deck or a similar framework embedded in a plastic cylinder.

Brown U.S. Pat. No. 3,641,948 essentially discloses conical metal spacer-supports having reinforcing ribs and sharpened projecting tines which are intended to engage the top and bottom decks. This structure however is believed to require a costly multi-step manufacturing operation which would involve unacceptable cost and reduced production speed.

None of this prior art, then, meets the requirements of the present invention which are to provide a very economical pallet construction and a spacer-support for that pallet wherein all of the components can be made cheaply and rapidly in a very economical fashion and, furthermore, to provide a method by which the pallet itself can be assembled cheaply and economically without sacrificing strength or usability.

SUMMARY OF THE INVENTION

It has been discovered, therefore, that an improved pallet can be provided having a unique spacer-support which is die stamped and rolled from a flat metal piece to form an elongate unitary tubular body with elongate tapered or sharpened tines projecting from the opposed ends thereof. In fact, such a spacer-support has been found to have utility in structures other than what are commonly known as "pallets" since such a spacer-support can have utility in joining together any two flat pieces of wood or similar material such as, for example a reel upon which wire might be wound.

It has further been discovered that an improved pallet can be constructed utilizing such spacer-supports by driving the top and bottom decks onto the tines by compressive force so that the tines project through the thickness of the deck and so that the sharpened ends are bent over on themselves and impressed into the wood or other deck material.

It has further been found that improved structural strength can be achieved if the opposed ends of the body of the spacer-support itself are partially embedded into the surface of the top and bottom deck.

It has also been found that by utilization of a modified form of the invention, further strengthening against lateral forces can be achieved by utilizing crossing straps to interconnect the slats or individual members of the bottom deck.

A further modification has disclosed that still greater strength against lateral collapse can be achieved by the utilization of a binder strip on the bottom surface of the top deck between the spacer-supports and the deck.

Accordingly, production of an improved spacer-support, pallet and method of assembling the same become the principal objects of this invention with other objects thereof becoming more apparent upon a reading of the following brief specification considered and interpreted in view of the accompanying drawings.

OF THE DRAWINGS:

FIG. 1 is a perspective view of the improved spacer-support.

FIG. 2 is an exploded view showing the spacer-support, the top and bottom decks and the reinforcing straps prior to assembly.

FIG. 3 is a partial perspective view showing the assembled pallet without the straps.

FIG. 4 is a full perspective view showing preferred form of the assembled pallet.

BRIEF DESCRIPTION OF THE PREFERRED EMBODIMENTS

Figure 5:
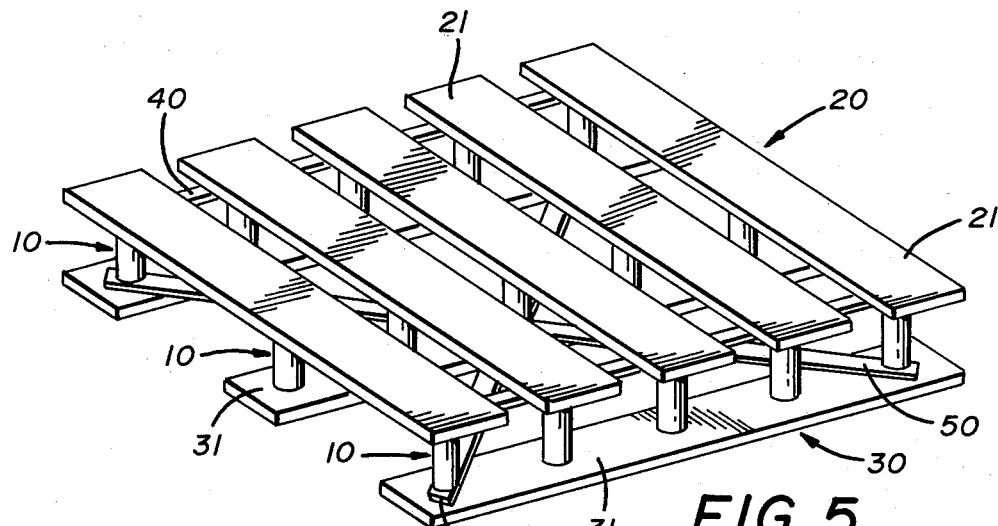
FIG. 5 is a perspective view similar to FIG. 4 showing a modified form of the invention.

Referring first then to FIG. 1 of the drawings, it will be noted that the spacer-support of the present invention, generally indicated by the numeral 10, includes an elongate tubular body 11 terminating in opposed ends 11a and 11b.

Integral with the body 11 and projecting from the ends 11a and 11b, are elongate tines 12 which are tapered or sharpened to terminate in sharp points 12a at their outboard ends. FIG. 1 also illustrates barbs or prongs 12b,12b projecting from one surface of the tines and pointing toward the body 11 of the spacer-support 10. This feature is optional and may be employed to enhance the holding power of the spacer-supports.

As noted above, it is contemplated that the spacer-support 10 will be formed by stamping it from a flat piece of metal and then rolling it with the opposed edges forming the open butt seam 13. This method of manufacture lends itself to rapid and inexpensive mass production and it should be noted that, if the barbs or prongs 12b,12b are employed, they also can be stamped in the same operation.

Referring then to FIGS. 2 and 4 of the drawings, it will be noted that, in this form of the invention, the top deck 20 consists of a plurality of slats 21,21 and the bottom deck 30 consists of a plurality of slats 31,31. The slats of the top and bottom decks are disposed with their longitudinal axes at right angles to each other in order to facilitate nesting of the pallets for shipping purposes when they are unloaded. In this way, one will nest with the other and approximately twice the number of pallets can be placed in a given space than is possible with conventional pallet structures.

The provision of only three bottom slats 31 as shown in FIG. 4, also permits easy engagement with the pallet by fork lift trucks which are commonly used to transport pallets.

Referring still then to FIGS. 2, 3, and 4 of the drawings, in FIG. 2 it will be noted that prior to assembly, the top and bottom decks 20 and 30 are disposed in spaced relationship by suitable apparatus (not shown) with a plurality of spacer-supports 10 interposed between them. In FIG. 2 only one is shown, but it will be understood that all the spacer-supports would be set in place at one time. Also FIG. 2 shows how the auxiliary or reinforcing straps 40 and 50 would be positioned prior to assembly. The function of these straps will be explained more fully below.

FIG. 3 shows the assembled pallet once compressive force has been applied to the outer surfaces of the decks, either to the top or bottom deck or both. At that time, the tines 12 will penetrate the top and bottom deck members 21 and 31 and the ends 12a thereof will be bent over on themselves and embedded in the deck material (see FIG. 6 also). The precise mechanism for completing this assembly is not illustrated herein, but either deck could be held in place with the other being driven toward it or both could be moved toward a center line.

Figure 6:
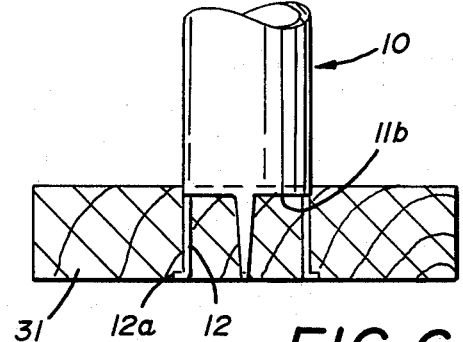
FIG. 6 is a partial sectional view taken along the line 6—6 of FIG. 3.

FIG. 6 also illustrates how the ends 11a, 11b of the body of spacer-support 10 are themselves partially embedded in the slats 21,31 for greater resistance to lateral collapsing forces.

It should be noted here that in FIG. 1 of the drawings, barbs or pointed projections 12b,12b are illustrated on the tines 12,12. These are optional, but it will be seen that, if employed, they will assist in resisting separation of top and bottom decks 20 and 30.

Reference to FIG. 4 will disclose a modified form of the invention wherein the top and bottom decks 20 and 30 and the spacer-supports 10 are identical to those already discussed. However, here elongate straps 40 are in place on the bottom surface of the top deck slats 21 for further strengthening purposes. The longitudinal axes of these straps run at right angles to those of slats 21 and they are trapped between the end of the spacer-supports 10 and the slats so as to provide resistance to collapse from laterally applied forces.

Figure 7:
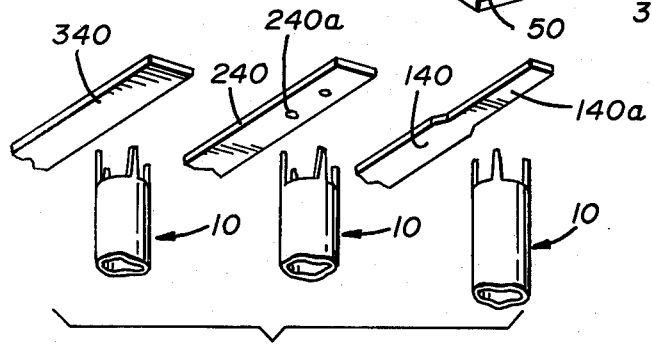
FIG. 7 is a partial perspective view showing various methods for securing the reinforcing straps.

FIG. 7 shows three alternative methods of securing these straps. Thus, the strap 140 may be provided with reduced width portions such as 140a so that all of the tines 12 straddle it. The strap 240 illustrates predrilled holes 240a which receive two of the the tines and the strap 340 is shown full width in which case the compressive force of the assembly operation is relied upon to force at least two of the tines 12 through the strap. In any of these situations, it will be apparent that the strap will be firmly held in place upon assembly of the pallet.

FIG. 5 shows a further modification wherein a binding strap 50 is disposed on the top surface of the slats 31 of the bottom deck 30 in a crossed arrangement. The spacer-support 10 is then driven into the bottom deck 30 with the tines stradling the strap 50. Straps 50 could also be secured in the alternative ways illustrated in FIG. 7 with regard to straps 140, 240, and 340. In any event, they will provide further stability.

Figure 8:
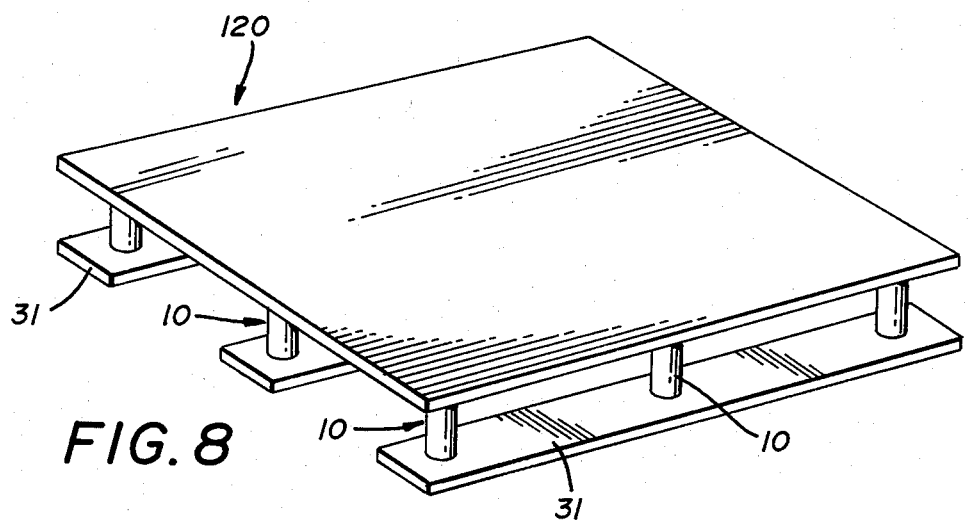
FIG. 8 is a perspective view of the improved pallet with a solid topdeck.

FIG. 8 illustrates a still further modification wherein top deck 120 is solid rather than comprised of a plurality of slats. The basic spacer-support 10 can also be employed in this version and the method of assembly would be the same as already described. However, in this version, fewer spacer-supports would be required.

It ought to be noted that in all forms of the invention, entry from all four sides of the pallet by the supporting arms of a fork lift truck or similar device is possible.

It will be seen then how an improved pallet and spacer-support have been developed which is simple to manufacture economically and which retains all of the desireable characteristics of conventional pallets.

While a full and complete description of the invention has been set forth in accordance with the dictates of the Patent Statutes, it should be understood that modifications can be resorted to without departing from the spirit hereof or the scope of the appended claims.

What is claimed is:

1. A load bearing pallet, comprising:
 (A) a top deck having top and bottom surfaces;
 (B) a bottom deck including a plurality of identical slats each having top and bottom surfaces;
 (C) spacer-supports each having an elongate, unitary tubular body with at least one sharpened tine projecting from each of the opposed ends thereof for penetration of and engagement with the slats of said bottom deck and said top deck;
 (D) said tines passing through said top and bottom decks and having their ends bent back upon themselves on the top surface of said top deck and the bottom surface of said bottom deck; and
 (E) the opposed ends of said tubular body at least partially penetrating the bottom surface of said top deck and the top surface of said bottom deck.

2. The pallet of claim 1 wherein said top deck includes a plurality of identical slats; said tines engaging and penetrating at least some of the slats of said top deck.

3. The load bearing pallet of claim 2 wherein a metal reinforcing strip is disposed on the bottom surface of said slats of said top deck between one end of said spacer-support and said bottom surface; said reinforcing strips being secured thereto by said spacer-supports.

4. The load bearing pallet of claim 2 wherein the longitudinal axes of said slats of said top deck are disposed at right angles to the longitudinal axes of said slats of said top deck.

5. The load bearing pallet of claim 1 wherein each of said tines have at least one barb projecting therefrom.

6. The load bearing pallet of claim 1 wherein a pair of reinforcing straps interconnect said slats of said bottom deck and are disposed in a crossing configuration; said reinforcing straps being secured thereto by said spacer-supports.

7. A method of constructing a load bearing pallet comprising the steps of:
   (A) providing a plurality of elongate slats for the top and bottom decks of the pallet in spaced relationship;
   (B) interposing a plurality of unitary spacer-supports each having at least one sharpened tine projecting from its opposed ends between said slats of the top and bottom decks; and
   (C) applying compressive force to the outer surfaces of said slats to force said tines into and through said slats so that the distal ends of said tines project beyond the exposed surfaces of said top and bottom decks and are bent back upon themselves and embedded in said decks, and wherein sufficient force is applied to force at least a portion of the opposed ends of said spacer-supports into said slats.

* * * * *